United States Patent Office 3,523,805
Patented Aug. 11, 1970

3,523,805
MOISTURE-RESISTANT PLASTER OF PARIS BANDAGES CONTAINING WATER-SWELLABLE GUMS
David F. Smith, 120 Grove St.,
Bay Head, N.J. 08744
No Drawing. Continuation-in-part of application Ser. No. 427,178, Jan. 21, 1965. This application Dec. 23, 1966, Ser. No. 604,144
Int. Cl. C04b *11/16*; A61f *13/04*
U.S. Cl. 106—112          5 Claims

ABSTRACT OF THE DISCLOSURE

This invention discloses moisture-resistant plaster of Paris bandages containing minor proportions of water-swellable gums which impart a smooth, creamy, plastic texture to the bandages as they are wet in water preparatory to use in making a cast.

---

This application is a continuation-in-part of my co-pending application, Ser. No. 427,178, filed Jan. 21, 1965, now abandoned.

Modern plaster of Paris bandages comprise strips or rolls of porous, flexible backing material such as 32 x 28 thread count surgical gauze coated or impregnated with 100 to 200 mesh U.S. standard screen size plaster of Paris which is bonded to itself and to the backing by a suitable adhesive in order to prevent excessive loss of plaster in handling the dry bandage and when it is wet in water and the excess water squeezed out preparatory to making a cast. It is desired that the wet bandage have a smooth, creamy, plastic feel or consistency and smooth out readily and yield a smooth finished cast. For many years methyl cellulose has been used for this purpose but it tends to make the bandage and the finished cast somewhat sensitive to moisture and is deficient in solubility in certain aqueous-organic liquids sometimes used in manufacture of the bandages. More recently (U.S. Pat. No. 3,043,298 by Brickman et al.) another cellulose ether (hydroxypropyl methyl cellulose—the propylene glycol ether of methyl cellulose) has been suggested in place of methyl cellulose ether, but it will be shown herein that this compound is also subject to disadvantage. The present invention discloses the unexpected advantages of a particular hydroxyethyl ethyl cellulose over these other two cellulose ethers. Since there are almost endless numbers of alkyl and hydroxyalkyl-alkyl cellulose ethers when there are considered variations in chain length of the cellulose units, variations in the types of substituent groups, degree of substitution of the groups and relative degrees of substitution of the types of group, it is necessary to specifically define the compounds that can be used—by far the most of which are unsuitable. In general cellulose ethers effective for the purpose are water-compatible—if they are not water-soluble or water-dispersable at least they must be water-wettable and water-swellable. These are properties characteristic of only a relatively very small proportion of all possible such compounds.

Bonded plaster of Paris bandages are made by preparing a slurry of powdered plaster in a volatile liquid in which the plaster does not set during processing, coating the slurry upon the backing and then heating the so-coated backing in an oven with air circulating at 190 to 250° F. to evaporate the slurry liquid and yield a dry, bonded, settable bandage that is very rapidly and thoroughly wetted when immersed in water and the setting-time of which is adjusted to between 2 and 8 minutes. Such a slurry normally contains (1) a suitable bonding agent that does not interfere with wetting or setting and preferably is dissolved or dispersed in the liquid (2) a material to accelerate the setting of the final product, such, for example, as potassium or zinc sulfate and (3) a softening agent such as a cellulose ether. The slurry liquid may be 60 to 90% by weight of aqueous methanol, ethanol, propanol, isopropanol or acetone; or it may be water containing a set-inhibitor that decomposes during the heating, such as ammonium borate as in U.S. Pat. No. 2,557,083 by Eberl or ammonium caseinate, ammonium caseinate and NH₃ or ammonium borate and NH₃ as in U.S. Pats. Nos. 3,191,597; 3,282,265 or 3,294,087 by Smith, respectively.

The following examples are given to illustrate the methods and products discussed herein, including the methods and products of the present invention, as more particularly pointed out hereinafter.

EXAMPLE 1

18.5 parts by weight of steam cooked aqueous starch solution containing 1.3 parts starch, 29.4 parts 29–30% aqueous NH₃ and 6.06 parts water are thoroughly mixed together.

0.033 part sodium alkyl naphthyl sulfonate wetting-agent are dissolved in the above solution.

0.123 part Argentina acid casein are wet in 2.94 parts water and dissolved by addition of 1.54 parts 29–30% aqua ammonia and the resulting solution added to the above solution.

There are then mixed into the above solution 2 parts of potassium sulfate set-accelerator ground to 100 mesh U.S. standard screen size or finer.

0.25 part hydroxyethyl ethyl cellulose (89% 50–100 cps. viscosity in 2% aqueous solution at 20° C. and 11% 250–400 cps.; degree of substitution of hydroxyethyl 0.8 and of ethyl 0.9) are mixed with 100 parts high density, low consistency 200 mesh size plaster of Paris (alpha gypsum) made by steam calcining gypsum (U.S. Pat. No. 1,901,051); and the mixture is added to the above solution with thorough mixing.

The resulting slurry was coated upon 32 x 28 mesh surgical gauze (boiled and bleached to meet U.S.P. standards and weighing about 8 pounds per 1000 square feet) at the rate to yield a dry bandage weighing about 230 to 240 grams per 5 sq. ft. and the so-coated gauze was dried at about 205° F. in a tenter drier to the point (but not substantially beyond) where a roll of the dried product after standing protected from moisture for a few hours (1 to 3) did not show any gritty feel when wet and formed into a cast. The dried web was cut and rolled into rolls 4 inches wide by 5 yards long.

EXAMPLE 2

Same as Example 1 except hydroxypropyl methyl cellulose (19 to 24% methoxyl and 4 to 12% propylene glycol ether; 100 cps. viscosity in 2% aqueous solution at 20° C.) in place of the hydroxyethyl ethyl cellulose.

EXAMPLE 3

Same as Example 1 except methyl cellulose (27.5 to 31.5% methoxyl; 100 cps. viscosity in 2% aqueous solution at 20° C.) in place of the hydroxyethyl ethyl cellulose.

EXAMPLE 4

11.3 grams of the 50–100 cps. hydroxyethyl ethyl cellulose of Example 1 was stirred for ½ hr. in 805 grams water, at which point it was completely dissolved (dispersed). To this solution was added with stirring 1879 grams of methanol (99%) and 1.5 grams sodium alkyl naphthyl sulfonate wetting-agent. There was then added 45.4 grams zein (corn protein). After stirring ½ hr. the solution was well dispersed, clear and uniform. Then 45.4 grams powdered potassium sulfate and 10.6 pounds of the plaster of Paris of Example 1 were thoroughly stirred into the solution. The resulting slurry was then coated and dried as in Example 1.

The products of Examples 1, 2, and 3 yielded well bonded, well setting bandages with good cast strengths (tests according to the methods of Federal Specification G–B–101d) and a smooth, plastic feel of the wet bandage. However the bandages of Examples 1 and 2 showed greater resistance to moisture than the bandages of Example 3, for example, when stored 1 to 5 days over water in a closed container—as evidenced by less slowing of the setting-time.

However, a marked difference between hydroxyethyl ethyl and hydroxypropyl methyl cellulose appeared in that the life of the slurry of Example 1 was 24 hours while that of Example 2 was less than 8¼ hours. This unexpected difference is very important practically since use of the former compound permits a smaller concentration of set-inhibitor in the slurry—and thus less residual traces of set-inhibitor in the final product to slow its set. The explanation for this marked difference in the useable life of the slurry is not known—perhaps it is related to an important difference in adsorption of the two compounds on the surface of the plaster particles or a difference in formation of some type of loose compound with some slurry ingredient. At any rate the important effects of seemingly minor differences are well known in plaster of Paris bandage making—as, for example, the very large effect on the set of very minor proportions of certain set-inhibitors. Since such slurries normally set if given sufficient time and thus are changing with time, it is important to obtain a slurry with long life using reasonably small proportions of set-inhibitor since then the change (increasing slurry viscosity, for example) during processing can be kept small.

When using organic slurry liquids it is desirable to dilute them with water in order to save cost, to increase the solubility of certain binders and other desired slurry ingredients and to obtain the more dense coating characteristic of the use of aqueous slurries.

Another advantage of the hydroxyethyl ethyl cellulose of the present invention over the hydroxypropyl methyl cellulose of Brickman et al. is that the former achieves the desired properties with a maximum degree of substitution of 2 (1 for hydroxyethyl and 1 for ethyl) out of a possible maximum of 3 on a cellulose (anhydroglucose) unit and thus permits of greater relative degree of substitution of the 2 groups within the useful range as compared with the much more highly substituted Brickman et al. compound wherein, as a matter of fact, his claim 3 defines a compound that is more than completely substituted in that with the *minimum* claimed methoxy content of 22% there is room on a cellulose unit of structure for only 37% propoxyl instead of the 50% claimed. In other words, if the methoxyl content is 22% its degree of substitution is 1.39—which leaves room for only 37% propoxyl, corresponding to a degree of substitution of 1.61.

Example 4 shows the applicability of the compound of the present invention where an aqueous-organic slurry liquid is used. In place of aqueous methanol, other volatile liquids can be used such as aqueous ethanol, propanol, isopropanol or acetone.

Bandages made by the method of Example 4 were very well bonded, showing a very low plaster loss both when wet and when dry and the wet bandage had a creamy, plastic consistency. In spite of using only 0.94 part potassium sulfate set-accelerator instead of the 2 parts per 100 parts plaster as in Examples 1, 2 and 3, these bandages had a very fast setting-time as compared with those of Examples 1–3 (down to 2 minutes 21 seconds as compared with 3½ to 4 minutes) and yielded casts of strengths as high as 628 pounds ½ hour after wetting the bandage as compared to 400 to 450 lbs. for the bandages of Examples 1–3 (tests made according to Federal Specification G–B–101d on 4 inch by 5 yard bandages). The proportion of zein may vary from about 0.3 to 1.5% and preferably about 1% of the weight of plaster of Paris and the hydroxyethyl ethyl cellulose from about 0.1 to 1%, preferably 0.2 to 0.4% of the weight of plaster. When using zein as binder dissolved in an aqueous-organic liquid the use of a water-swellable cellulose ether is highly desirable in order to improve the consistency of the wet bandage. In order to dissolve sufficient cellulose ether in the slurry liquid it is necessary that the aqueous-organic liquid contain at least 15% water. Since zein is insoluble in water but wetted by water and is not soluble in the organic liquids used but only if they contain water, water-soluble binders like dextrin and cooked starch can be replaced by methyl cellulose (27.5 to 33% methoxyl; viscosity 50 to 4000 cps. in 2% aqueous solution at 20° C.), hydroxypropyl methyl cellulose (19 to 30% methoxyl and 4 to 12% propylene glycol ether and viscosity 50 to 4000 cps. in 2% aqueous solution at 20° C.) or the hydroxyethyl ethyl cellulose described hereinbefore and obtain bandages that are unexpectedly low in moisture sensitivity.

On the other hand, due to the moisture-resistant properties of the zein, dextrin and/or cooked starch when present do not yield a moisture-sensitive bandage and impart a desired plastic consistency to the wet bandage. However in order to dissolve (disperse) dextrin or cooked starch in the slurry liquid, a high proportion of water must be used in the aqueous-organic slurry liquid—for example, 40 to 90% of the weight of the liquid. But with such high proportions of water, ammonium caseinate, ammonium borate or $NH_3$ or combinations of the latter with the caseinate or borate must be used in order to obtain long slurry life—in which case the proportions of these set-inhibitors are as stated hereinafter. Ammonia-containing aqueous-organic slurry liquids that contain the maximum amount of $NH_3$ that will remain dissolved therein at atmospheric pressure can be made by mixing commercial 29–30% aqua ammonia with the organic liquid, the excess ammonia over that soluble in the aqueous-organic liquid being displaced when the organic liquid dissolves in the aqua ammonia and leaving the aqueous-organic liquid about saturated with $NH_3$ at about atmospheric pressure. A slurry liquid made in this way will dissolve dextrin and/or cooked starch if it contains 40 to 90% water and will yield a slurry with a long life. The ammonia will assist in dissolving the starch and/or dextrin due to its emulsifying properties. The zein-bonded bandages may contain 0.3 to 1.5% potassium sulfate set-accelerator or zinc sulfate or mixtures of these, the weights being based upon the weight of plaster, when ammonium borate or ammonium caseinate are not used or when ammonia alone is used. When the caseinate or borate is used the proportion of set-accelerator may be 0.5 to 2% of the weight of the plaster. The amount of dextrin or cooked starch or mixtures of these used with the zein binder may be from 0.1 to 1% of the weight of plaster. Since all of the potassium or zinc sulfate may not dissolve in the slurry liquid containing much ammonia or much organic liquid, the set-accelerator should be 100 mesh U.S. standard screen size or finer, in order to avoid a gritty feel in the wet bandage.

The proportions of hydroxyethyl ethyl cellulose can vary from about 0.1 to 1% of the weight of plaster and preferably from 0.2 to 0.3%. Proportions of hydroxypropyl methyl or methyl cellulose are the same as with hydroxyethyl ethyl cellulose. Bonding materials such as starch, dextrin and polyvinyl acetate emulsion solids can be used in the water slurry liquid in amounts from about 0.3 to 1.5% of the weight of plaster and mixtures of these binders can be used. The amounts of potassium or zinc sulfate accelerator or mixtures of these can vary from about 0.5 to 2% of the weight of the plaster when ammonium caseinate or borate is used; otherwise from about 0.3 to 1.5% can be used. In aqueous-organic liquid slurry the organic liquid can vary from about 60 to 85% by weight without using set-inhibitor and the bonding agent can be zein or polyvinyl acetate emulsion solids in amounts from about 0.3 to 1.5% of the weight of plaster.

The amount of aosein or boric acid used to form their ammonium salts in aqueous ammonia solution can vary from about 0.01 to 1% of the weight of plaster and the $NH_3$ used in the water slurry can be between about 22 and 1% $NH_3$ based on the total weight of the slurry liquid. When the caseinate or borate concentration is low, the ammonia must be high. Of course the ammonia caseinate or borate is hydrolyzed during heating of the coated bandage leaving casein or boric acid, respectively, in the dry bandage—materials that do not affect the set. The borate, caseinate or $NH_3$ can also be used in the aqueous-organic slurry liquid to increase slurry life, particularly if the organic liquid is below about 60%, the use of $NH_3$ being especially advantageous here since it is completely volatile upon heating and thus unlike the case where caseinate or borate is used, leaves no traces of set-inhibitor to slow the set of the dry bandage. The $NH_3$ concentration in the aqueous-organic liquid may be from about 1% of the weight of the water therein up to the saturation value in the liquid with $NH_3$ at atmospheric pressure. In the latter case the organic liquid may be reduced to 10% of the weight of the liquid. The use of the larger proportion of water gives greater solubility of slurry ingredients such as the cellulose ethers, potassium sulfate and even starch or dextrin.

While the hydroxyethyl ethyl cellulose can vary in viscosity from about 50 to 4000 centipoises in 2 weight percent aqueous solution at 20° C. and its degree of substitution of hydroxyethyl and ethyl groups can vary from about 0.5 to 1, it must be water-swellable and preferably soluble in the aqueous-organic slurry liquid to the extent of at least 0.1% of the weight of plaster.

In place of the sodium alkyl naphthyl sulfonate wetting-agent used in Examples 1–4, other wetting-agents such as sodium lauryl sulfate can be used.

All proportions herein given are by weight except in the case of degree of substitution which is given in molecular proportions according to common practice and all viscosities refer to 2 weight percent aqueous solution at 20° C. When zinc sulfate is indicated as set-accelerator, it is meant to include $ZnSO_4$, $ZnSO_4 \cdot 6H_2O$ and $ZnSO_4 \cdot 7H_2O$.

What is claimed is:
1. A moisture-resistant, plaster of Paris bandage comprising a porous flexible backing material impregnated with powdered plaster of Paris bonded to itself and to the backing with from 0.3 to 1.5% of the weight of plaster of Paris, of zein, and containing in substantially uniform admixture from about 0.1 to 1% of the weight of plaster of Paris of a material selected from the class consisting of (1) methyl cellulose containng about 27.5 to 31.5% methoxyl by weight and of viscosity from 50 to 4000 centipoises in 2 weight percent aqueous solution at 20° C. (2) hydroxypropyl methyl cellulose containing 19 to 39% by weight of methoxyl and from 4 to 12% by weight of propylene glycol ether and of viscosity from 50 to 4000 centipoises in 2 weight percent aqueous solution at 20° C. and (3) hydroxyethyl ethyl cellulose of from 0.5 to 1 degree of substitution of hydroxyethyl groups and from 0.5 to 1 degree of substitution of ethyl groups and of viscosity from 50 to 4000 centipoises in 2 weight percent aqueous solution at 20° C. (3) dextrin (4) cooked starch; and further containing in substantially uniform admixture from 0.3 to 1.5% of the weight of the plaster of Paris of a set-accelerator at least as finely-divided as 100 mesh U.S. standard screen size, selected from the class consisting of potassium sulfate, zinc sulfate and mixtures thereof.

2. The bandage of claim 1 which further contains in substantially uniform admixture from about 0.01 to 1% of the weight of plaster of Paris of a material selected from the class consisting of ammonium borate and ammonium caseinate.

3. The bandage of claim 1 wherein the said material is a mixture of cooked starch and dextrin in which each is in amount from 0.1 to 1% of the weight of plaster of Paris.

4. The bandage of claim 3 which further contains in substantially uniform admixture from about 0.01 to 1% of the weight of plaster of Paris of a material selected from the class consisting of ammonium borate and ammonium caseinate.

5. The bandage of claim 1 wherein the first said material selected is the hydroxyethyl ethyl cellulose of part (3).

References Cited
UNITED STATES PATENTS

| | | | |
|---|---|---|---|
| 3,043,298 | 7/1962 | Brickman et al. | 128—91 |
| 3,215,549 | 11/1965 | Ericson | 106—111 |
| 3,282,265 | 11/1966 | Smith | 106—115 |
| 3,294,087 | 12/1966 | Smith | 106—115 |

JAMES E. POER, Primary Examiner

U.S. Cl. X.R.

106—113, 114, 115; 128—91

UNITED STATES PATENT OFFICE
CERTIFICATE OF CORRECTION

Patent No. 3,523,805  August 11, 1970

David F. Smith

It is certified that error appears in the above identified patent and that said Letters Patent are hereby corrected as shown below:

Column 5, line 7, "aosein" should read -- casein --; line 13, "ammonia", second occurrence, should read -- ammonium --. Column 6, lines 26 and 27, "ammonium borate" should read -- boric acid --; and "ammonium caseinate" should read -- casein --; same column 6, lines 35 and 36, "ammonium borate" should read -- boric acid --; and "ammonium caseinate" should read -- casein --.

Signed and sealed this 2nd day of March 1971.

(SEAL)
Attest:

Edward M. Fletcher, Jr.  WILLIAM E. SCHUYLER, JR.
Attesting Officer  Commissioner of Patents